Nov. 9, 1937. M. STAUNT 2,098,317
DENTAL APPLIANCE
Filed Sept. 19, 1935
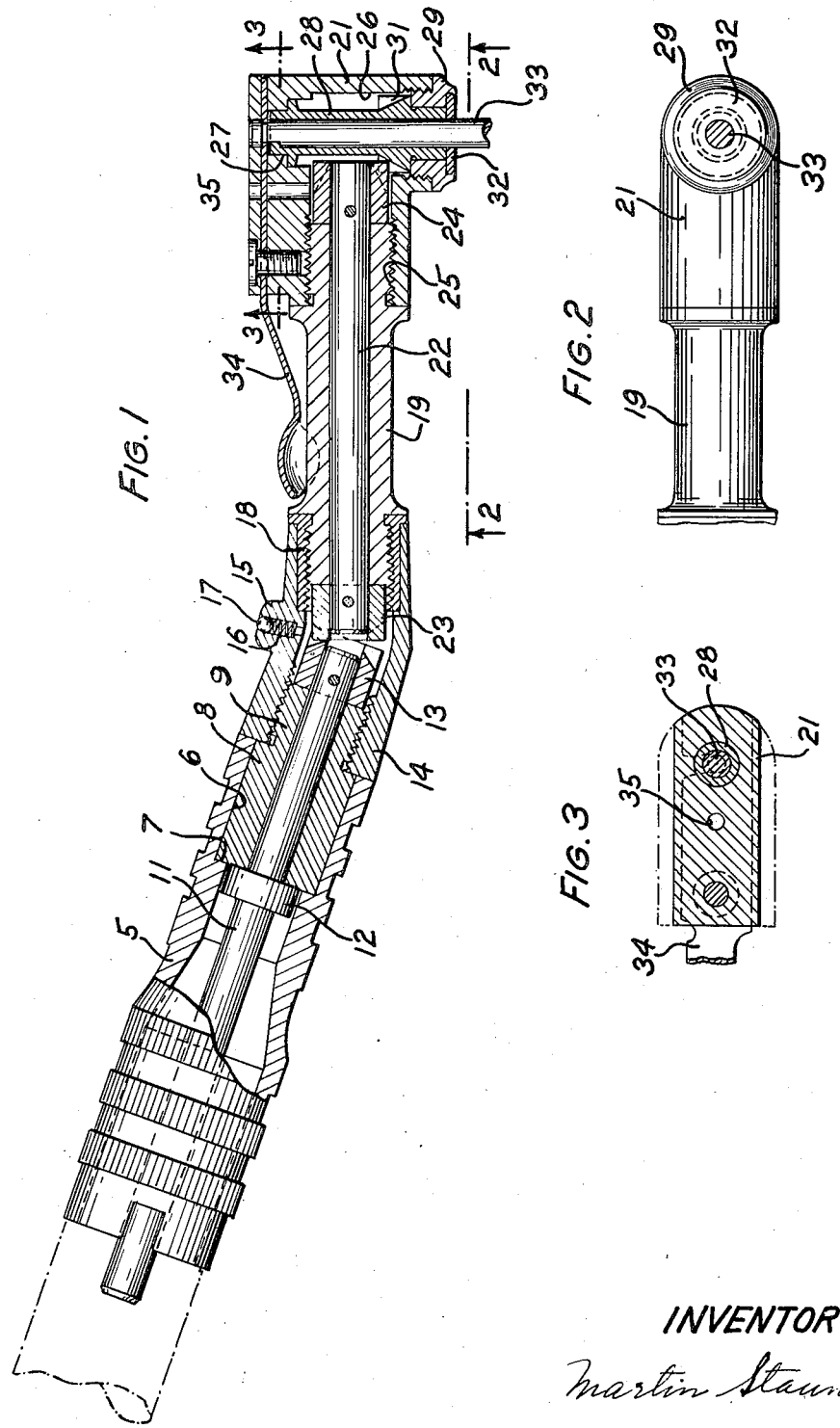
INVENTOR
Martin Staunt Patented Nov. 9, 1937

2,098,317

UNITED STATES PATENT OFFICE 2,098,317

DENTAL APPLIANCE

Martin Staunt, Chicago, Ill.

Application September 19, 1935, Serial No. 41,219

3 Claims. (Cl. 32—27)

My invention relates to a dental apparatus and more particularly to an apparatus used in drilling and polishing teeth.

Apparatus of this type is used largely in oral dentistry where it comes in contact with saliva, other oral fluids or dentifrices which tend to corrode and coat the moving parts of the apparatus and interfere with its proper operation.

An object of the invention is to provide a new and improved dental apparatus.

A further object is to provide means whereby the apparatus is maintained in effective operating condition.

A further object is to provide an effective seal for the operating parts of the apparatus.

Other objects and advantages will appear as the description proceeds.

A complete understanding of the invention may be had by reference to the following description taken in conjunction with the accompanying drawing in which, Figure 1 is a longitudinal section of an apparatus embodying the invention, Figure 2 is an elevation of the head portion of the apparatus looking in the direction of the arrows on line 2—2 of Figure 1, and, Figure 3 is a sectional view taken on line 3—3 of Figure 1.

Referring now more in detail to the drawing, a tubular handle or grip 5 is provided which is preferably made of brass or other suitable material and is chromium plated with a nickel undercoating. This grip has a bore 6 at its forward end which has a shoulder 7 at its inner end. The bore 6 receives a bearing 8 having a reduced threaded end 9. This bearing as well as the shaft 11 journalled therein is made of stainless steel which is not corroded or deleteriously coated if saliva or any other oral fluid or dentifrices should find their way into the interior of the apparatus.

Shaft 11 has an integral collar 12 which abuts against one end of the bearing 8 and the forward end of the shaft is provided with a gear 13 abutting against the other end of the bearing 8 thus positioning the shaft and gear.

The reduced end 9 of the bearing is adapted to receive an internally threaded contra-angle joint 14 the body of which consists of an integral tubular member of brass or other suitable material which is chromium plated with a nickel undercoating. In making the contra-angle joint 14 a bead 15 is integrally formed thereon. The bead 15 has a relatively large bore extending substantially through the wall thereof and a smaller bore from the end of the large bore to the interior. A spring 16 is placed in the large bore of the bead and a ball is located above the spring. The upper end of the bead is then swaged to slightly reduce the diameter of the upper end of the bore and thus retain the ball and spring in position. A lubricant may be introduced through the opening in the bead to lubricate the parts adjacent thereto and the spring pressed ball will prevent the lubricant from coming back through the opening.

The forward end of the contra-angle joint has an internally threaded sleeve 18 secured therein for receiving the threaded end of a shank 19. After the proper angular position of the shank has been determined to correctly position the head 21 of the apparatus the sleeve 18 is pressed and soldered in position. The entire shank 19 with its reduced threaded ends serves as a bearing for a shaft 22 and therefore the entire shank as well as the shaft therein are made of stainless steel. The rearward end of shaft 22 carries a gear 23 and the forward end carries a gear 24 both of stainless steel.

The head 21 of the apparatus consists preferably of nickel and chromium plated brass and has an internally threaded bore 25 for receiving the reduced forward end of shank 19 and a transversely extending bore 26. The upper end of bore 26 is reduced in two steps and has a bearing 27 secured in its upper end in which the upper end of a tubular shaft 28 is journalled. The lower end of shaft 28 is journalled in bearing 29 which is threaded into the lower internally threaded position of bore 26. Shaft 28 has an enlarged portion 31 into which gear teeth are cut and this gear meshes at right angles with the gear 24. The shaft 28 as well as bearings 27 and 29 are made of stainless steel to prevent corrosion and consequent sticking of these parts.

An important feature of the invention is the stainless steel cap 32 of bearing 29 which covers the end of the shaft 28 and fits snugly about the stem 33 of the burr or other instrument to be rotated by the apparatus. This cap effectively prevents oral fluids and dentifrices from entering the apparatus and coming in contact with the operating parts of the apparatus. In order to secure the cap on the bearing the bearing is countersunk and the cap is placed in the countersunk portion. The cap is then swaged to expand its peripheral diameter to hold it securely in place.

The spring clip 34 is the customary device for retaining the stem of the burr in place and since it forms no part of this invention it will not be described in detail. This clip covers the lubricating aperture 35 so that it is not necessary to provide other means for preventing the egress of lubricant at this point.

The apparatus of this invention overcomes many of the difficulties usually encountered with such apparatus in that it excludes objectionable matter from entering the apparatus and obviates the effect of the entrance of such minute quantities of foreign matter as cannot be prevented from entering and at the same time it insures effective lubrication of the apparatus.

It will be understood that the nature and embodiment of the invention is merely illustrative and that many changes and modifications may be made therein without departing from the spirit and scope of the invention.

What I claim as new and desire to secure by United States Letters Patent is:

1. A dental apparatus comprising a head having a tubular shaft for receiving the stem of a tool, a removable bearing for one end of said shaft, said bearing having a countersunk end, and a cap having a pressure fit in said countersunk end for covering the end of said tubular shaft.

2. A dental apparatus comprising a head having a pair of transversely extending bores, one of said bores supporting a tubular shaft adapted to receive the stem of a tool, said latter bore having an inwardly threaded end, a combined removable bearing and cap for the end of said tubular shaft and threaded into said threaded end of said bore, said bearing having a countersunk end, and said cap having a pressure fit in said countersunk end, said cap having an annular recess in its outer surface surrounding the stem of a tool in said shaft, and a cap adapted to fit closely about the stem of said tool, said cap covering the end of said bearing and being fixedly secured in said recess, the other of said bores supporting a tubular extension, a shaft in said tubular extension, and gearing connecting said latter shaft and said tubular shaft, a further tubular extension carried by the first-mentioned tubular extension and extending at an angle thereto, a shaft in said further tubular extension, gearing connecting said last-mentioned shafts, said further tubular extension having a lubrication aperture located adjacent said gearing, and valve means in said extension for controlling said aperture and preventing the outward flow of lubricant.

3. A dental apparatus comprising a head having a tubular shaft for the stem of a tool, a combination bearing and cap for the end of the shaft adapted to receive the stem of said tool, the cap portion of said bearing covering the end of said tubular shaft and having an aperture for the stem of said tool, said cap portion being pressure fit into a countersunk portion of said bearing.

MARTIN STAUNT.